United States Patent
Bachle et al.

[11] Patent Number: 6,162,995
[45] Date of Patent: Dec. 19, 2000

[54] ARMORED ELECTRICAL CABLE CONNECTOR

[75] Inventors: Walter W. Bachle, Harwinton; Jeffrey R. Edgerly, Plainville, both of Conn.

[73] Assignee: General LLC, Farmington, Conn.

[21] Appl. No.: 07/874,651

[22] Filed: Apr. 27, 1992

[51] Int. Cl.$^7$ .................................................. H02G 3/18
[52] U.S. Cl. .................... 174/151; 174/65 R; 174/65 G; 174/65 SS; 285/161; 285/322
[58] Field of Search .................. 174/151, 65 R, 174/66 SS, 65 G, 51, 78; 285/161, 341, 322, 323

[56] References Cited

U.S. PATENT DOCUMENTS

| | | | |
|---|---|---|---|
| 1,714,590 | 5/1929 | Dake | 174/65 R X |
| 3,052,748 | 9/1962 | Curtiss | 174/51 |
| 3,567,843 | 3/1971 | Collins et al. | 174/51 |
| 4,250,348 | 2/1981 | Kitagawa | 174/65 SS |
| 4,323,727 | 4/1982 | Berg | 174/65 SS X |
| 4,490,576 | 12/1984 | Bolante et al. | 174/65 SS |
| 4,549,037 | 10/1985 | Bawa et al. | 174/65 SS |
| 4,549,755 | 10/1985 | Kot et al. | 174/65 SS X |
| 4,608,454 | 8/1986 | Lackinger | 174/65 SS |
| 4,692,561 | 9/1987 | Nattel | 174/65 SS |
| 4,692,562 | 9/1987 | Nattel | 174/65 SS |
| 4,787,657 | 11/1988 | Henniger | 285/323 |
| 4,814,547 | 3/1989 | Riley et al. | 174/65 SS |
| 4,885,429 | 12/1989 | Schnittker | 174/65 SS |
| 5,015,804 | 5/1991 | Nattel et al. | 174/65 SS |
| 5,048,872 | 9/1991 | Gehring | 285/322 X |
| 5,059,747 | 10/1991 | Bawa et al. | 174/65 SS |

FOREIGN PATENT DOCUMENTS

| | | | |
|---|---|---|---|
| 0322625 | 7/1989 | European Pat. Off. | 285/322 |
| 3512578 | 10/1986 | Germany | 174/65 R |

*Primary Examiner*—Hyung Suo Sough
*Attorney, Agent, or Firm*—Howell & Haferkamp, L.C.

[57] ABSTRACT

A connector for armored electrical cable apparatus which includes a body having a central bore. The body has a generally cup shaped seat disposed in generally aligned relationship to the bore and the body has external threads disposed on the external surface thereof. A dual finger member which is generally cylindrical and has a first plurality of axially extending fingers disposed about the circumferential extent of the generally cylindrical member and a second plurality of axially extending fingers disposed about the circumferential extent of the generally cylindrical member. The free ends of all of the first plurality of axially extending fingers are disposed at a first axial extremity of the generally cylindrical member and the free ends of all of the second plurality of axially extending fingers are disposed at a second axial extremity of the generally cylindrical member. A nut dimensioned and configured for engagement with the threads on the body.

16 Claims, 6 Drawing Sheets

ARMORED ELECTRICAL CABLE CONNECTOR

BACKGROUND OF THE INVENTION

The invention relates to electrical cable connectors and particularly to such connectors intended for use with a jacketed metal clad cable assembly. Such cable assemblies contain a plurality of insulated wires that have a metal armor jacket disposed about the wires. An outer waterproof jacket, typically made of a thermoplastic material, is disposed around the armor jacket to exclude water or other foreign matter. In some forms of the invention the armor jacket may be in the form of a helical winding to increase the flexibility of the cable. The metal armor is grounded for safety reasons. Cables of this type may be used for transmitting power and/or control signals for use in distribution centers, motors, panel boards, and numerous other electrical and electromechanical apparatus.

The present connector is intended to terminate such metal clad cables and to connect to such apparatus. Such connectors must (1) provide a good electrical connection between the armor and the box, (2) a good seal to prevent water and other foreign matter from passing intermediate the connector and the cable, and (3) a good mechanical strength to secure the cable within the connector.

The prior art connector designs for this type of cable typically include a rubber grommet to seal out water and to mechanically connect the cable to the junction box. The conventional rubber grommet design uses a gland nut to compress the grommet axially. When the grommet is compressed axially the grommet sides are displaced radially inwardly and outwardly. This radial movement is typically utilized to seal and to hold the outside of the cable's armored jacket. The disadvantage of this design is that the range of the grommet is limited by the force the gland nut can apply to the grommet and the ability of the rubber to displace in a radially direction when subjected to an axial force. The displacement is the controlling factor in determining the ability of the grommet to seal and to hold the cable in position. The ability of the grommet to hold the cable in position is the limiting factor in determining the pullout force characteristic of the connector.

Twisting of the cable may be a problem when a connector utilizing a gland nut. More particularly, the torque applied to the nut may be transmitted to the grommet and cable.

Some other means of electrical connection is usually used to electrically connect or ground the armor jacket to the junction box via the body of the connector. Such means usually incorporate helical teeth, or thin flexible springs. The conventional methods of electrically connecting the armor jacket to the body include using resilient springs in conjunction with a mechanical force developed by pressing against the grommet. In order for the spring to be resilient and accept a wide range of cable the spring must be thin in order to be resilient. The spring thickness limits the cross sectional area of the electrical grounding path through the spring and could result in destruction of the ground path if the fitting was subjected to large ground fault currents. Other disadvantages of thin springs are the inherently low contact forces obtained with thin springs. The low contact forces and oxides that may form on the contact surfaces may in a poor electrical connections. Other typical conventional designs have cable twisting problems during installation.

One known construction is shown in U.S. Pat. No. 5,059,747. This construction suffers from the disadvantages described above.

It is an object of the invention to provide a cable connector that provides a reliable grounding connection to the armored cable.

Another object of the invention is to provide a connector that will not twist the wires within the cable when a connection is made.

Still another object is to provide a good seal to prevent water and other foreign matter from passing intermediate the connector and the cable.

A further object of the invention is to provide a good mechanical strength to secure the cable within the connector. In other words, the connector should have a high pullout strength.

Still another object of the invention is to provide a connector that is capable of cooperating with a large range of sizes of armored cable.

It is yet another object of the invention to provide apparatus that allows easy installation of a cable without disassembling the fitting.

SUMMARY OF THE INVENTION

It has now been found that these and other objects of the invention may be attained in a connector for armored electrical cable apparatus which includes a body having a central bore. The body has a generally cup shaped seat disposed in generally aligned relationship to the bore and the body has external threads disposed on the external surface thereof. A dual finger member comprising a generally cylindrical member having a first plurality of axially extending fingers disposed about the circumferential extent of the generally cylindrical member and a second plurality of axially extending fingers disposed about the circumferential extent of the generally cylindrical member. The free ends of all of the first plurality of axially extending fingers are disposed at a first axial extremity of the generally cylindrical member and the free ends of all of the second plurality of axially extending fingers are disposed at a second axial extremity of the generally cylindrical member. The apparatus also includes a nut dimensioned and configured for engagement with the threads on the body.

In some forms of the invention the dual finger member is dimensioned and configured for passage into the bore and the nut includes a cup shaped surface. The dual finger member may be dimensioned and configured for cooperation with the seat and the cup shaped surface. The apparatus may further includes an 0-ring extending circumferentially around the dual finger member intermediate the roots of the first and second plurality of axially extending fingers.

In some forms of the invention the apparatus includes a grommet disposed within the first plurality of axially extending fingers and each of the first plurality of fingers have a portion thereof which is offset from the finger in some forms of the invention. Each of the first plurality of fingers has a portion thereof proximate to the free end thereof which is thicker than the remainder of the finger and each of the first plurality of fingers have a notched portion thereof proximate to the free end thereof in some forms of the invention.

Each of the notched portions may be dimensioned and configured to nest with at least a part of an offset portion on one other of the fingers in the first plurality of fingers. The apparatus may further includes a split ring stop member.

BRIEF DESCRIPTION OF THE DRAWING

The invention will be better understood by reference to the accompanying drawing in which.

DESCRIPTION OF THE PREFERRED EMBODIMENT

Figure 1:
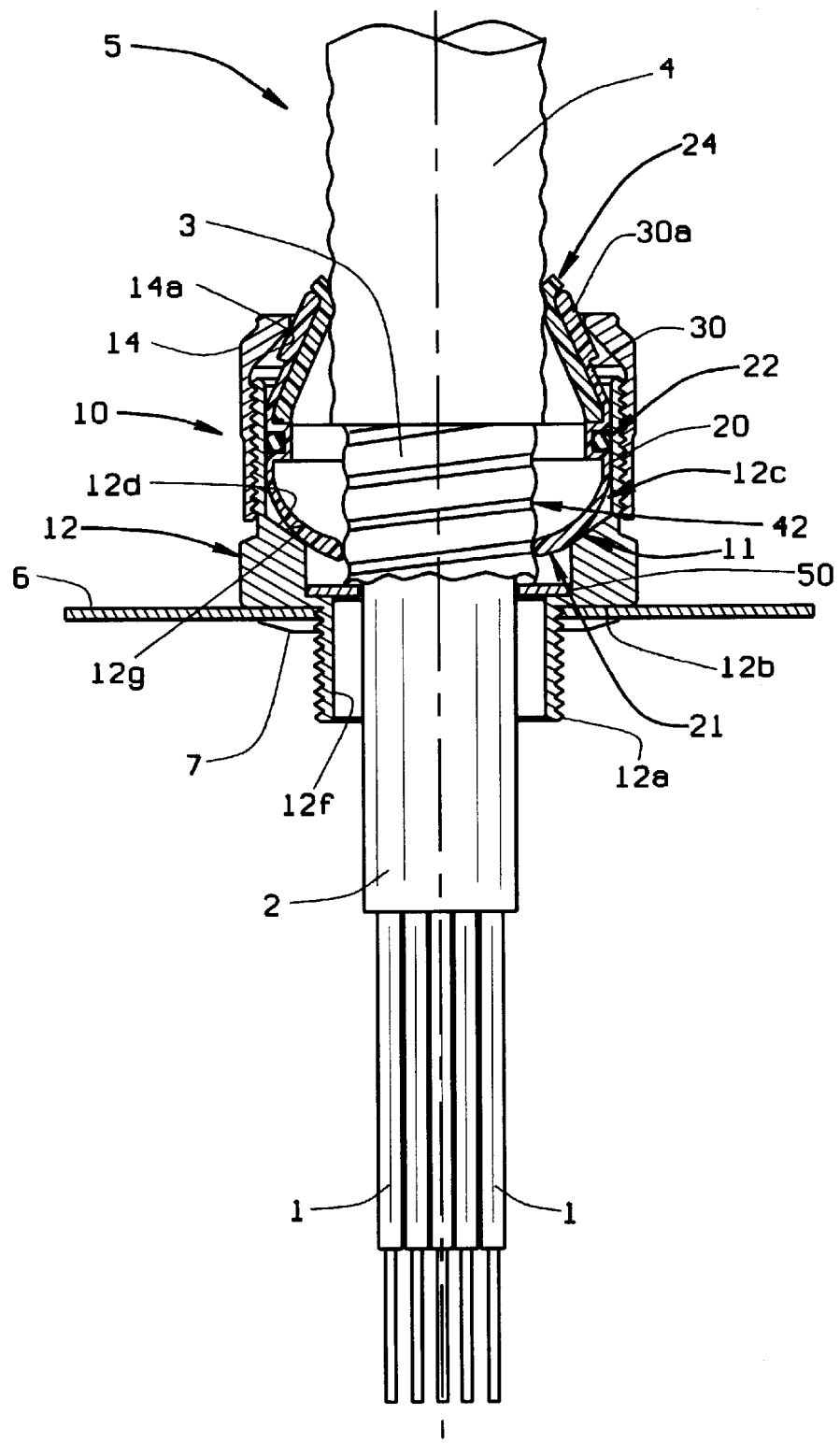
FIG. 1 is an elevational view, in partial section, of an assembled connector in accordance with one form of the invention.

Referring to the drawing and particularly to FIG. 1 there is shown a cable connector assembly 10 in accordance with one form of the invention. The cable connector assembly 10 cooperates with a cable that includes a plurality of insulated conductors 1 surrounded over most of the axial extent thereof by an insulating sleeve 2 that is covered over most of the axial extent thereof by a metal armor jacket 3. The metal armor jacket 3 is covered over most of the axial extent thereof by a outer waterproof jacket 4.

The cable connector assembly 10 in accordance with one form of the invention joins the cable 5 to a junction box 6. For simplicity only a fragmentary portion of the junction box 6 has shown. A nut or locknut 7 secures a body 12 of cable the connector assembly 10 to the junction box 6.

The body 12 of the cable connector assembly 10 is generally rotationally symmetrical. The body 12 has a first axial extremity 12a that is generally cylindrical and provided with external threads for cooperation with the nut 7. A shoulder 12b abuts the face of the junction box 6 when the cable connector assembly 10 is installed. The second axial extremity of the body 12 has a bore 12c which extends throughout the entire axial extent of the body 12. The bore 12c has a cup shaped portion 12d. The cupped shaped portion 12d has knurling 12g disposed on the face thereof.

Figure 4:
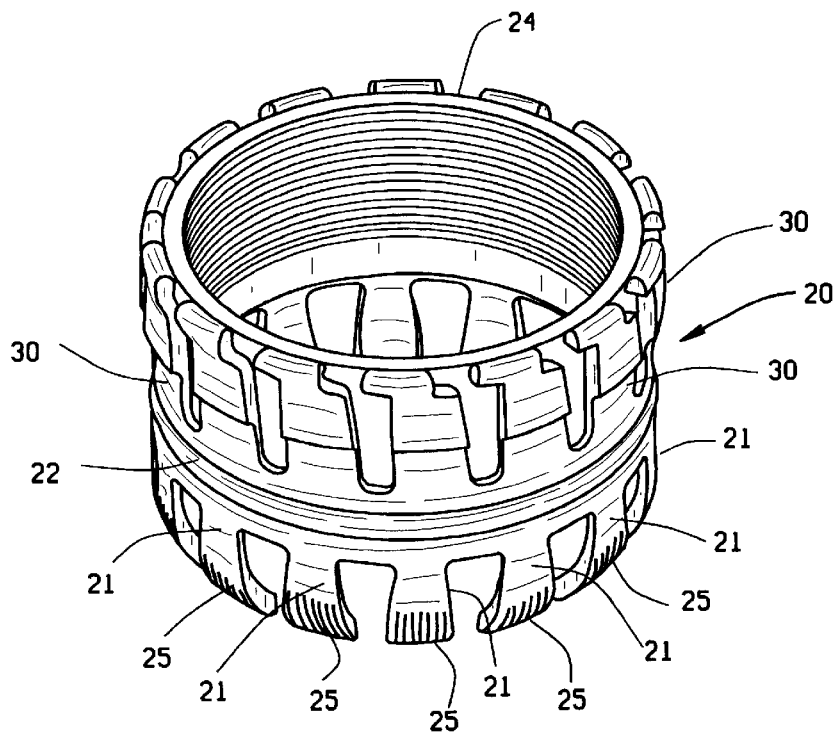
FIG. 4 is a perspective view of a dual finger member that is a part of the connector in accordance with the invention.

The bore 12c and particularly the cup shaped portion 12d and the knurling 12g cooperate with a dual finger member 20. The cable connector assembly 10 accomplishes grounding, securing, sealing functions with the dual finger member 20. The dual finger member 20 is manufactured in a generally cylindrical form as best show in FIG. 4. More particularly, the dual finger member 20 has a first set of armor or grounding fingers 21 extending generally axially. A second set of grommet fingers 30 also extends axially in the opposite direction from the grounding fingers 21. The grounding fingers 21 may include knurling 25 on the outer face thereof. It will be understood that any surface upset will be equivalent to knurling.

The grommet fingers 30 each have a free end portion 30a that has a greater thickness than the root portion thereof. In addition the portion 30a also includes an offset 30b that meshes with a notch 30c on an adjacent finger 30 in the preferred embodiment. Disposed within the grommet fingers 30 is a thin walled grommet 24. The thin walled grommet 24 is ordinarily made from a rubber like material typically used in sealing applications. The dual finger member 20 has a circumferential slot disposed substantially at the axial midpoint thereof intermediate the grommet fingers 30 and the grounding fingers 21. An O-ring 22 is disposed in the slot 40.

The nut 14 cooperates with the threads on the body 12. As the nut is tighened the fingers 21, 30 of the dual finger member bend. A split ring stop member 50 is positioned over the insulating sleeve 2 and butts against the axial extremity of the metal armor jacket 3 to limit axial travel thereof within the connector assembly 10.

Figure 5:
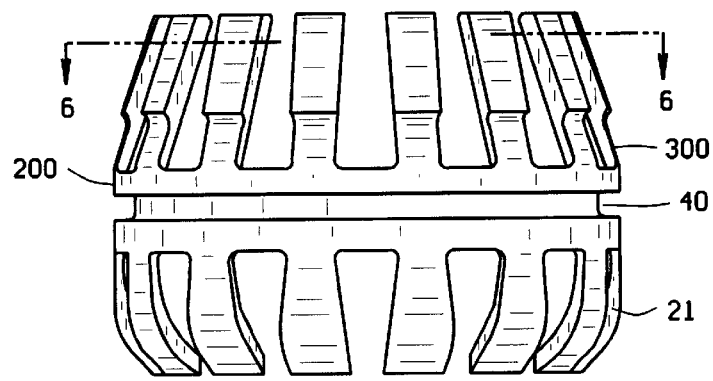
FIGS. 5 and 6 are respectively elevational and partial plan views of one form of the dual finger member that is a part of the connector assembly in accordance with the invention.
Figure 6:
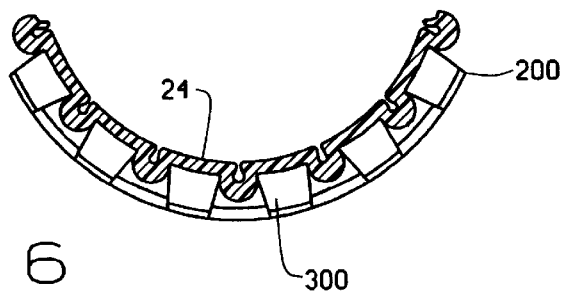

An alternative to the grommet fingers 30 shown in FIGS. 5 and 6. More particularly, the dual finger member 200 includes grommet fingers 300. The grommet fingers 300 have sides that substantially parallel throughout the axial extent thereof. Thus there is no offset 30a or notch 30c.

Figure 2:
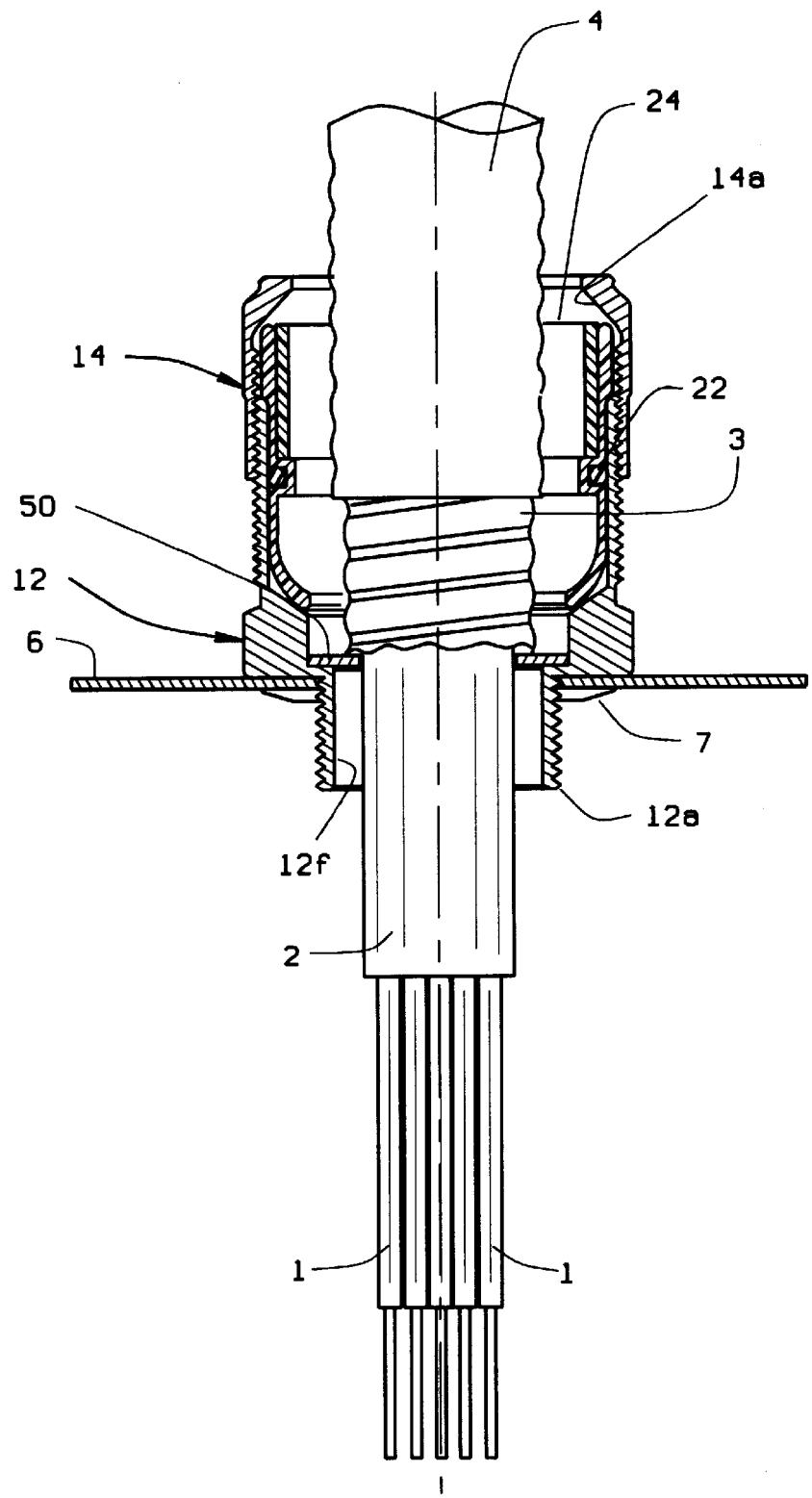
FIG. 2 is an elevational view, in partial section, similar to that of FIG. 1 showing the components thereof just prior to tightening of the locknut.
Figure 3:
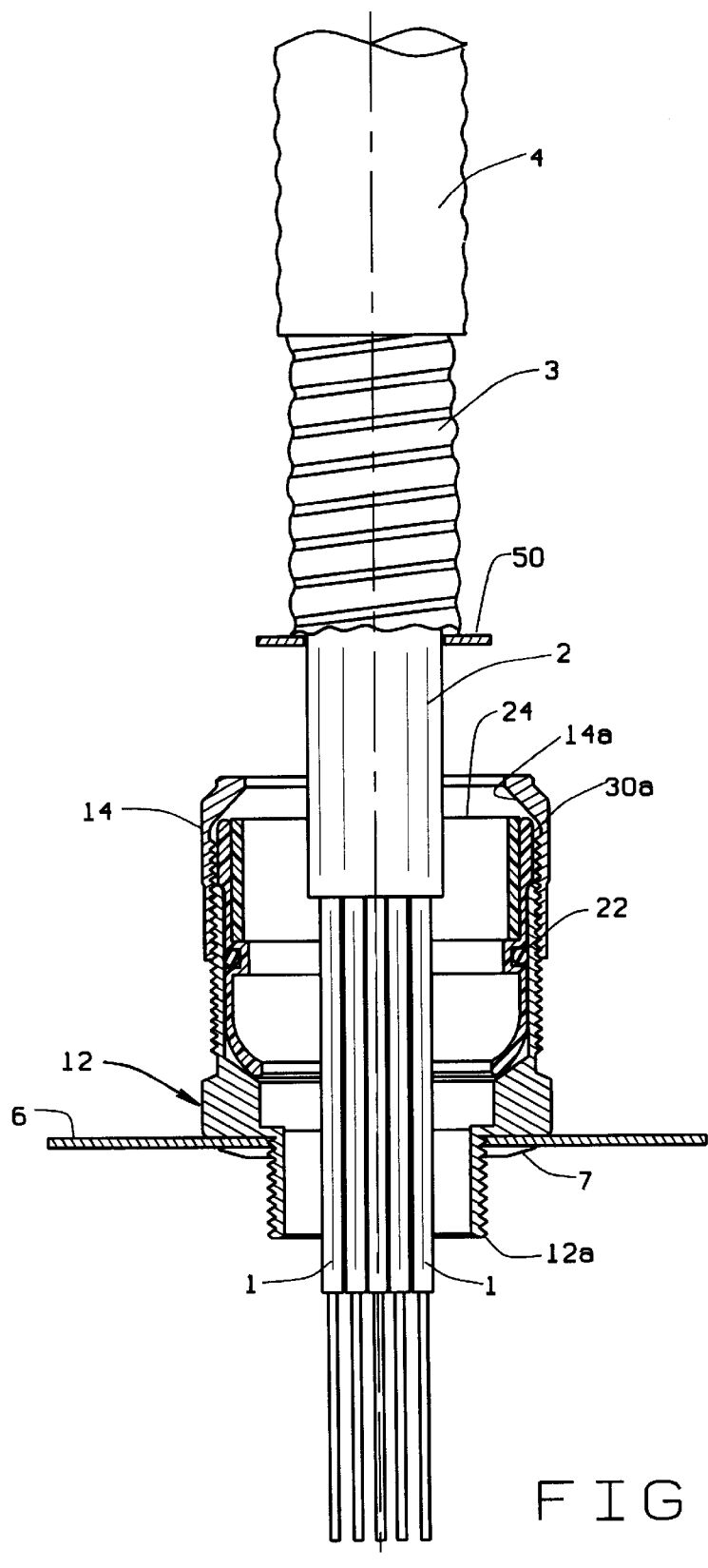
FIG. 3 is an elevational view, in partial section, similar to that of FIGS. 1 and 2 showing the components of the connector as the conductors are being inserted into the connector.
Figure 9:
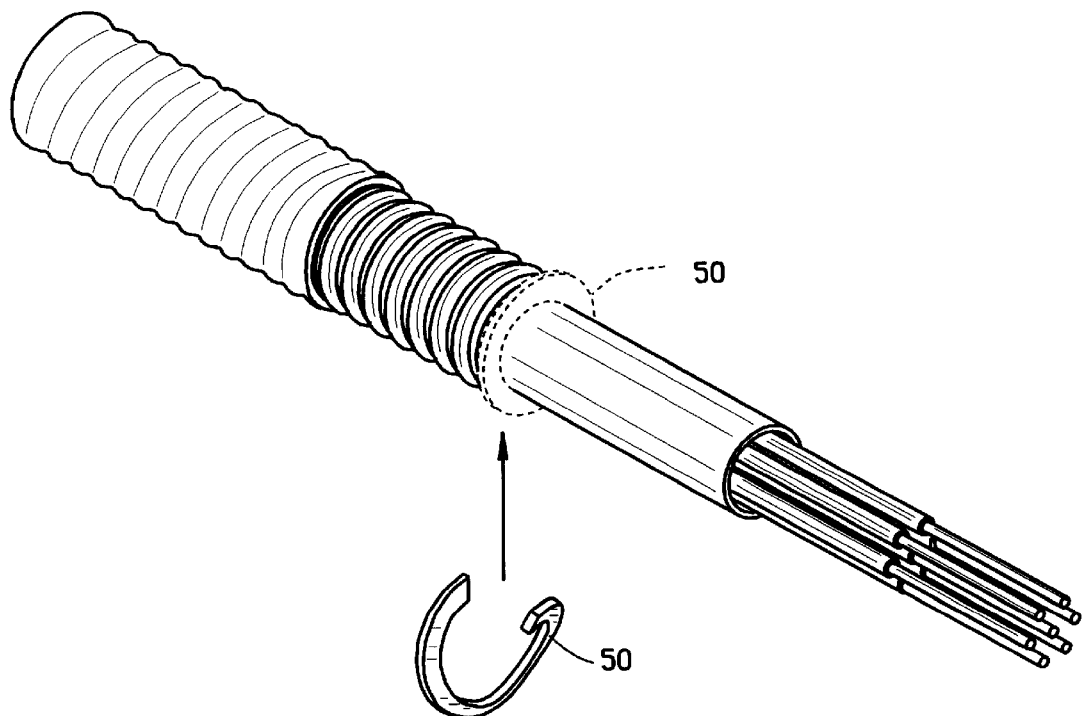
FIG. 9 is an exploded perspective view of the end of a cable showing the location of a split ring stop member to limit the axial travel of the cable into the connector in accordance with one form of the invention.
Figure 12:
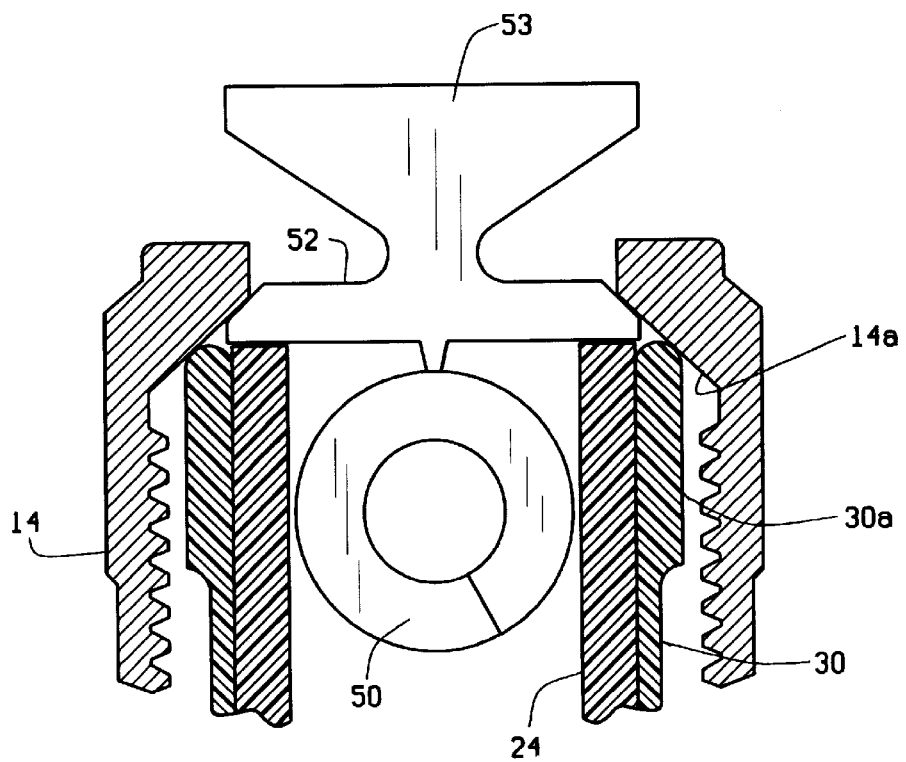
FIG. 12 is a fragmentary elevational view of a portion of the connector which illustrates how a stop ring may be packaged to avoid being lost.

The assembly of the connector assembly 10 to the cable 5 will be most apparent by sequential reference to FIGS. 3, 2, and 1. FIG. 3 is a cross section view of the connector assembly 10 which shows the plurality of insulated conductors 1 being installed into the connector assembly 10. The installation of the connector assembly 10 on a cable 5 having an armor 3 diameter smaller than the inside diameter of the first axial extremity 12a of the body 12 requires an armor stop 50 to locate the end of the armor 3. Prior art connectors have typically had an armor stop built into the connector and the user had the option of removing it prior to determining the relative size of the connector and the cable. The cable connector assembly 10 in accordance with one form of the invention utilizes a split ring stop member 50 which is not part of the connector body. Thus the split ring stop member 50 may be installed on the end of the prepared cables against the armor as depicted in FIG. 9. Installation in this manner avoids the necessity of threading the conductors through a remote armor stop opening. If the armor stop was built in the connector body, installation would be difficult and the installer might have to disassemble the fitting in order to run the conductors through the armor stop opening. The split armor stop can also be preassembled in the manner shown in FIG. 12. In this embodiment the split ring stop member 50 is molded of nylon or other plastic with a tab 52 that is dimensioned and configured to seat between the nut 14 and the thin walled grommet 24.

The split ring stop member 50 will not become detached from the connector assembly 10 because the length of the tab is greater than the inside diameter of the upper (as viewed) axial extremity of the nut 14. Some embodiments of the invention may also include a second tab 53 to permit easier grasp of the tab 52 and the split ring stop member 50. This form of the invention also makes the split ring stop member 50 more accessible to the end user.

FIG. 2 shows the cable 5 in place ready for the installer to tighten the nut 14. The split ring stop member 50 positions the end of the armor 3 within the bore 12f at a lower (as viewed) elevation than the armor fingers 30 of the dual finger member. The end of the armor 3 and the rest of the cable and the armor fingers 30 are then positioned so the nut 14 may be tightened in order to bend the armor fingers 30 around the cable 5 as seen in FIG. 1. As the nut 14 is tightened a cupped portion 14a thereof on the inside of the nut 14 applies a combination axial ($F_a$) and radial force ($F_r$) to the grommet finger 30. The axial force results in a downward pressure on the dual finger member 20 pushing the grounding fingers 21 against the cupped shaped portion 12d of the body 12 resulting in the bending of the grounding fingers towards the armor 3.

The installation torque to the nut also presents a torque to the dual finger member which will rotate unless it is held in equilibrium by an equal opposing torque. If this torque where not opposed the dual finger clamped around the cable 5 would rotate causing the cable 5 to twist.

The apparatus in accordance with the invention provides an anti-rotational feature by relying on (1) knurling 25 on the grounding or armor fingers 21 and/or (2) knurling 12g on the cup shaped portion 12d of the body 12.

The torque applied to the nut 14 will tend to rotate the dual finger member 20. Because the dual finger member 20 is clamped by the grounding fingers 21 to the cable 5, the cable 5 will also tend to turn. The actual turning is a function of the coefficient of friction between the metal surfaces of the grommet fingers 21 and the cupped shaped portion 12d. In other words the friction between the grommet fingers 21 and the cup shaped portion 12d will affect the amount of actual turning of the dual finger member 20 and hence the cable 5. The torque applied by the nut 14 to the dual finger member 20 is function of the coefficient of friction between the two metal surfaces to which the knurling is applied. Without knurling the coefficient of friction is typically between 0.1 and 0.2. With knurling the coefficient of friction is typically at least 0.4 and may be higher than 0.6.

As a safety feature the geometry of the grounding fingers 21 are designed to close first over the armor jacket 3 so that the armor fingers 21 ground the armor 3 before the grommet fingers 30 close around the cable jacket 4. If the grommet fingers 30 closed first the installer might think the fitting 10 is installed and not complete the installation by grounding the cable 5. Put another way, this fitting 10 is designed to have the grounding fingers 21 electrically ground the armor jacket 3 first before the grommet fingers 30 seal and secure the outside jacket 4 of the cable 5. In this manner when the installer sees the grommet fingers 30 close the critical grounding function is already completed and the fitting will be properly grounded. Unlike conventional grommet seals this design compresses the grommet 24 radially as the grommet fingers 30 are bent inwardly allowing the fitting to encompass a large range of cable.

Figure 7:
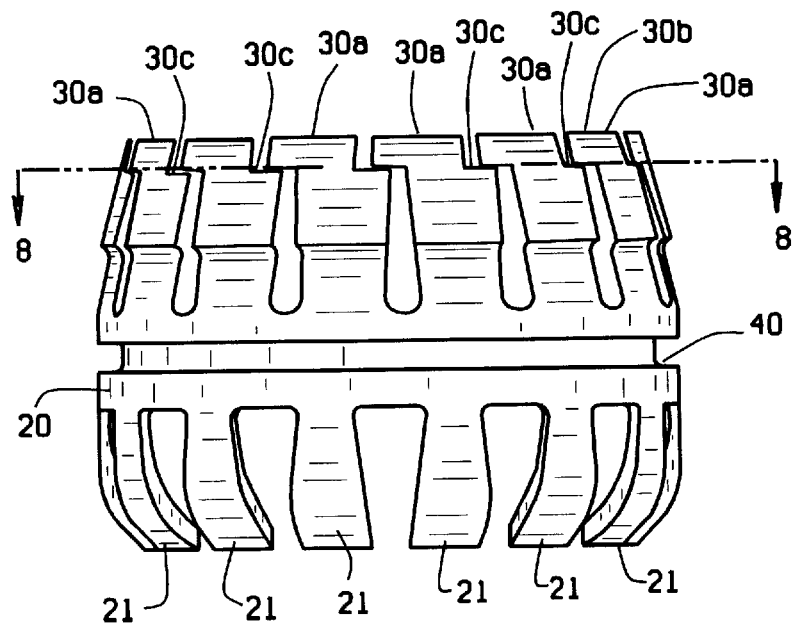
FIGS. 7 and 8 are respectively elevational and partial plan views of a different and preferred form of the dual finger member that is a part of the connector assembly in accordance with the invention.
Figure 8:
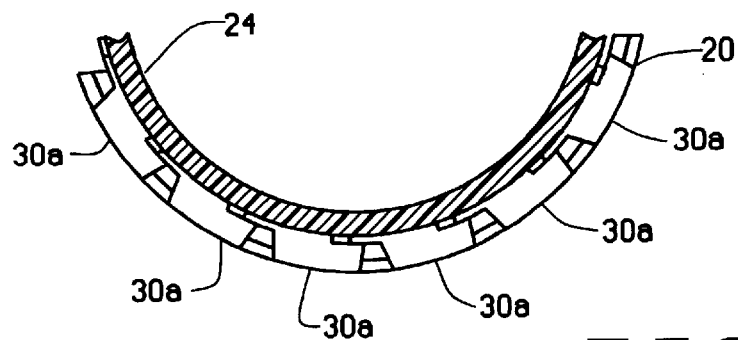
Figure 10:
FIGS. 10 and 11 are respectively side elevational and plan views of the split ring stop member show in FIG. 9.
Figure 11:
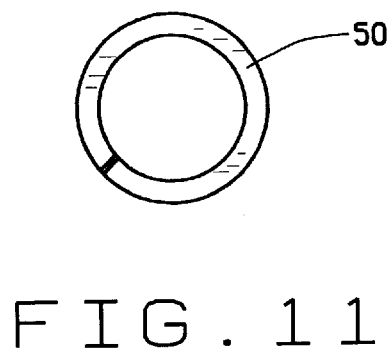

In the form of the invention shown in FIGS. 5 and 6 the seal is ordinarily not as satisfactory although it may be sufficient for some applications. More particularly, with fingers 300 having straight sides the space between the fingers 30 results in the thin walled grommet 24 extruding radially outwardly as shown in FIG. 6. This will also result in uneven sealing forces around the circumference of cable 5. In order to provide a more continuous circumferential sealing force on the grommet the fingers 30 are designed with offset ends as shown in FIG. 7. When the fingers 30 bend inwardly to compress the grommet the offset portions 30a will mesh together to provide a more uniform circumferential force around the grommet.

It will be seen that the grounding fingers 21 squeeze around the armor 3 of the cable 5 to make multiple ground connections between the body 12 and nut 14. The grounding fingers 21 also squeeze around the armor 3 of the cable connector assembly 10 to provide a high retaining force and high conductivity to hold the cable's armor 3 in place within the fitting. The grommet fingers 30 squeeze and compress the thin walled grommet 24 around the outer jacket 4 of the cable 5 to be installed and provide a retaining force to hold the cable 5 in place within the fitting or connector 5.

The grommet fingers 30 squeeze and radially compress a thin walled grommet 24 around the outer jacket 4 of the cable 5 to be installed and provide a watertight seal between the outer cable jacket 4 and the inside of the cable connector assembly 10. The grommet fingers 30 and the offset portion 30 IS nesting with respective notches 30c. The O-ring 22 provides a seal between the body 12 and the dual finger member 20 and excludes liquids from the inside of the cable connector assembly 10. In addition to the above improvements a split cable stop has been designed to install over the conductors next to the armor end without having to snake the conductors through a conventional solid washer type armor stop.

It will be seen that the invention provides industry with an improved connector having (1) a low resistance ground from the armor to the body of the connector, (2) high mechanical forces holding the body to both the armor jacket and outer plastic jacket, (3) the ability to take a much larger range of different cable sizes because of the use of a thin walled grommet used with the dual finger member, and (4) the ability to be installed without twisting of the cable.

Ordinarily the split ring armor stop 50 will be manufactured of plastic. The thin walled grommet 24 and the O-ring O-ring 22 will ordinarily be made from a rubber like material. The rest of the elements of the connector assembly 10 will ordinarily be manufactured of a conductive metal such as aluminum.

Although the invention has particular application to cables having an outer jacket it will be understood the connector may also be used with cables that do not have such a jacket.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described my invention we claim:

1. A connector for armored electrical cable apparatus which comprises:

a nut;

a body having a central bore, said body having a generally cup shaped seat disposed in generally aligned relationship to said bore, said body having threads disposed on a surface thereof; and a dual finger member comprising a generally cylindrical member having a first plurality of axially extending fingers disposed about the circumferential extent of said generally cylindrical member and a second plurality of axially extending fingers disposed about the circumferential extent of said generally cylindrical member, the free ends of all of said first plurality of axially extending fingers being disposed at a first axial extremity of said generally cylindrical member and the free ends of all of said second plurality of axially extending fingers being disposed at a second axial extremity of said generally cylindrical member, said dual finger member is dimensioned and configured for passage into said bore and said nut and said threads on said body are on an external surface of said body, said nut including a cup shaped surface, said dual finger member is dimensioned and configured for cooperation with said seat and said cup shaped surface, said connector further includes an O-ring extending circumferentially around said dual finger member intermediate the roots of said first and second plurality of axially extending fingers.

2. The connector as described in claim 1 wherein:

said connector further includes a grommet disposed within said first plurality of axially extending fingers.

3. The connector as described in claim 2 wherein:

each of said first plurality of fingers have an elongated portion and a portion offset from said elongated portion thereof which is offset.

4. The connector as described in claim 3 wherein:

each of said first plurality of fingers have a portion thereof proximate to the free end thereof which is thicker than the remainder of said finger.

5. The connector as described in claim 3 wherein:

each of said plurality of fingers includes a notch, each of said notches nesting with an offset on an adjacent finger.

6. The connector as described in claim 4 wherein:

each of said first plurality of fingers have a notched portion thereof proximate to the free end thereof.

7. The connector as described in claim 6 wherein:

each of said notched portions are dimensioned and configured to nest with at least a part of an offset portion on one other of said fingers in said first plurality of fingers.

8. The connector as described in claim 7 wherein:

said connector further includes a split ring stop member.

9. The connector as described in claim 8 wherein:

said split ring stop member is manufactured with a tab that is dimensioned and configured to seat between elements of said connector during shipment.

10. The connector as described in claim 9 wherein:

said tab is dimensioned and configured to seat between said grommet and said nut.

11. A connector for armored electrical cable apparatus which comprises:

means for gripping the armor of an associated cable;

means for gripping the outer covering of an associated cable;

a split ring stop member for cooperation and location an armor covering of the associated a cable, said split ring stop member being dimensioned and configured to be installed on a cable without the necessity of threading the free end of said cable into said split ring stop member.

12. The connector as described in claim 11 wherein:

said split ring stop member is manufactured with a tab that is dimensioned and configured to seat between elements of said connector during shipment.

13. The connector as described in claim 12 wherein:

said connector includes a nut and a grommet and said tab is dimensioned and configured to seat between said grommet and said nut.

14. The connector as described in claim 13 wherein:

said means for gripping the armor is metallic and constitutes a means for grounding.

15. The connector as described in claim 14 wherein:

said means for gripping the armor is metallic and constitutes a means for grounding.

16. The connector as described in claim 15 wherein:

said means for gripping the armor is metallic and constitutes a means for grounding.

\* \* \* \* \*